(12) United States Patent
Yamashita et al.

(10) Patent No.: US 11,482,868 B2
(45) Date of Patent: Oct. 25, 2022

(54) SECONDARY BATTERY PROTECTION CIRCUIT

(71) Applicants: Daichi Yamashita, Tokyo (JP);
 Norihito Kawaguchi, Tokyo (JP);
 Yoshihiro Satake, Tokyo (JP);
 Nobuhito Tanaka, Tokyo (JP); Koji Koshimizu, Tokyo (JP)

(72) Inventors: Daichi Yamashita, Tokyo (JP);
 Norihito Kawaguchi, Tokyo (JP);
 Yoshihiro Satake, Tokyo (JP);
 Nobuhito Tanaka, Tokyo (JP); Koji Koshimizu, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 712 days.

(21) Appl. No.: 16/509,979

(22) Filed: Jul. 12, 2019

(65) Prior Publication Data

US 2020/0091742 A1 Mar. 19, 2020

(30) Foreign Application Priority Data

Sep. 13, 2018 (JP) .............................. JP2018-171568

(51) Int. Cl.
 *H02J 7/00* (2006.01)
 *H02H 7/18* (2006.01)
 (Continued)

(52) U.S. Cl.
 CPC ......... *H02J 7/0029* (2013.01); *H01M 10/448* (2013.01); *H02H 1/0007* (2013.01);
 (Continued)

(58) Field of Classification Search
 CPC .. H02J 7/0029; H02J 7/00302; H02J 7/00306; H01M 10/448; H02H 1/0007; H02H 7/18
 (Continued)

(56) References Cited

U.S. PATENT DOCUMENTS 8,773,073 B2 7/2014 Kimura
9,996,097 B2 * 6/2018 Umemoto ................. G05F 3/08
 (Continued)

FOREIGN PATENT DOCUMENTS

CN 101154116 4/2008
CN 101989748 3/2011
 (Continued)

OTHER PUBLICATIONS

Office Action dated May 27, 2021 with respect to the corresponding Chinese patent application No. 201910655034.7.
 (Continued)

*Primary Examiner* — Yemane Mehari
(74) *Attorney, Agent, or Firm* — IPUSA, PLLC (57) ABSTRACT

A secondary battery protection circuit for a secondary battery includes: a reference voltage circuit configured to generate a reference voltage by using a depletion-type transistor and a transistor unit of enhancement type connected in series with the depletion-type transistor; a voltage divider configured to output a detection voltage obtained by dividing a power source voltage of the secondary battery; a detection circuit configured to detect an abnormal state of the secondary battery based on the reference voltage and the detection voltage; a first adjustment circuit configured to adjust a size ratio of the depletion-type transistor to the transistor unit based on threshold voltages of the depletion-type transistor and the transistor unit; and a second adjustment circuit configured to adjust the detection voltage based on the reference voltage after adjusting the size ratio.

11 Claims, 7 Drawing Sheets

(51) Int. Cl.
*H01M 10/44* (2006.01)
*H02H 1/00* (2006.01)

(52) U.S. Cl.
CPC ............ *H02H 7/18* (2013.01); *H02J 7/00302* (2020.01); *H02J 7/00306* (2020.01)

(58) Field of Classification Search
USPC .............................. 429/7; 320/162, 163, 164
See application file for complete search history.

(56) References Cited

U.S. PATENT DOCUMENTS

| | | | | |
|---|---|---|---|---|
| 2010/0117602 | A1* | 5/2010 | Matsui | H02J 7/00308 320/152 |
| 2012/0249087 | A1* | 10/2012 | Kimura | H02H 7/18 320/164 |
| 2016/0372954 | A1* | 12/2016 | Kageyama | H02J 7/00304 320/134 |

FOREIGN PATENT DOCUMENTS

| | | |
|---|---|---|
| CN | 102738775 | 10/2012 |
| JP | H04-98307 | 3/1992 |
| JP | 2000-089843 | 3/2000 |
| JP | 2016-143227 | 8/2016 |
| KR | 10-2014-0043626 | 4/2014 |

OTHER PUBLICATIONS

Office Action dated Sep. 9, 2020 with respect to the corresponding Korean patent application No. 10-2019-0087497.
Office Action dated Jul. 24, 2020 (Indian Patent Application No. 201924028523).

* cited by examiner

SECONDARY BATTERY PROTECTION CIRCUIT

CROSS-REFERENCE TO RELATED APPLICATION

This patent application is based on and claims priority to Japanese Patent Application No. 2018-171568 filed on Sep. 13, 2018, the entire contents of which are hereby incorporated by reference.

BACKGROUND OF THE INVENTION

1. Field of the Invention

The present invention relates to a secondary battery protection circuit.

2. Description of the Related Art

Conventionally, a reference voltage circuit is known, which generates a constant reference voltage using a depletion-type transistor and an enhancement-type transistor connected in series (see, Patent Document 1, for example).

However, variation in a temperature characteristic of reference voltage may occur due to manufacturing variation of circuits.

Accordingly, the present disclosure provides a secondary battery protection circuit that can reduce variation in a temperature characteristic of reference voltage.

CITATION LIST

Patent Document

[Patent Document 1] Japanese Laid-open Patent Application Publication No. 2016-143227

SUMMARY OF THE INVENTION

There is provision of a secondary battery protection circuit configured to monitor a state of a secondary battery and to protect the secondary battery when detecting an abnormal state. The secondary battery protection circuit includes: a reference voltage circuit configured to generate a reference voltage by using a depletion-type transistor and a transistor unit of enhancement type connected in series with the depletion-type transistor; a voltage divider configured to obtain a detection voltage by dividing a power source voltage of the secondary battery, and to output the detection voltage; a detection circuit configured to detect the abnormal state based on the reference voltage and the detection voltage; a first adjustment circuit configured to adjust a size ratio of the depletion-type transistor to the transistor unit based on a threshold voltage of the depletion-type transistor and a threshold voltage of the transistor unit; and a second adjustment circuit configured to adjust the detection voltage based on the reference voltage after the size ratio is adjusted by the first adjustment circuit, such that the detection circuit can detect the power source voltage of the secondary battery reaching a predetermined voltage.

DETAILED DESCRIPTION OF THE PREFERRED EMBODIMENTS

In the following, embodiments of the present disclosure will be described with reference to the drawings. First, variation in a temperature characteristic of reference voltage caused by manufacturing variation of the circuit will be described.

Figure 1:
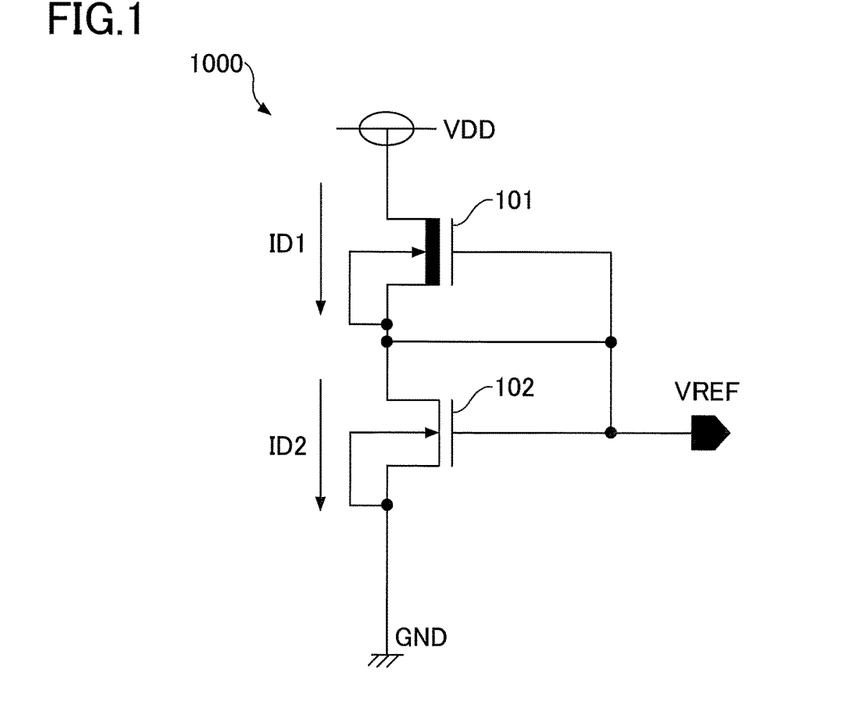
FIG. 1 is a diagram illustrating a configuration example of a basic reference voltage circuit.

FIG. 1 is a diagram illustrating a configuration example of a basic reference voltage circuit. A reference voltage source 1000 illustrated in FIG. 1 can output a constant reference voltage VREF independent of variation in a magnitude of power supply voltage (potential difference between a high potential section of power supply VDD and a low potential section of power supply GND). The reference voltage source 1000 uses a depletion-type N-channel metal oxide semiconductor (NMOS) transistor 101 and an enhancement-type NMOS transistor 102 connected in series between the high potential section of power supply VDD and the low potential section of power supply GND to generate a constant reference voltage VREF. Hereinafter, the depletion-type NMOS transistor 101 is referred to as the transistor 101, and the enhancement-type NMOS transistor 102 may be referred to as the transistor 102. Drain current ID1 of the transistor 101 is represented by the following equation (1), and drain current ID2 of the transistor 102 is represented by the following equation (2).

$$ID1 = \frac{1}{2}\mu_{ND} C_{OX} \frac{W_{ND}}{L_{ND}} (-Vthnd)^2 \quad (1)$$

$$ID2 = \frac{1}{2}\mu_{NE} C_{OX} \frac{W_{NE}}{L_{NE}} (V_{GS} - Vthne)^2 \quad (2)$$

In the equation (1) $\mu_{ND}$ denotes electron mobility in the transistor 101, $C_{ox}$ denotes gate capacitance per unit area of the transistor 101, $W_{ND}$ denotes a channel width of the transistor 101, $L_{ND}$ denotes a channel length of the transistor 101, and Vthnd denotes threshold voltage of the transistor 101. In the equation (2), $\mu_{NE}$ represents electron mobility in the transistor 102, $C_{ox}$ represents gate capacitance per unit area of the transistor 102, $W_{NE}$ represents a channel width of the transistor 102, $L_{NE}$ represents a channel length of the transistor 102, Vthne represents threshold voltage of the transistor 102, and $V_{GS}$ represents gate-source voltage of the transistor 102.

In the following description, a ratio of a channel length to a channel width may be referred to as a "ratio (W/L)". Also, a relationship between a ratio (W/L) of a depletion-type transistor (transistor 101) and a ratio (W/L) of an enhancement-type transistor (transistor 102) are defined as the following equation (3).

$$\frac{W_{ND}}{L_{ND}} = X \frac{W_{NE}}{L_{NE}} \quad (3)$$

$W_{ND}/L_{ND}$ represents a ratio (W/L) of a depletion-type transistor, and $W_{NE}/L_{NE}$ represents a ratio (W/L) of an enhancement-type transistor. Thus, X corresponds to a ratio of the ratio (W/L) of the depletion-type transistor to the ratio (W/L) of the enhancement-type transistor. In the present embodiment, X (a ratio of the ratio (W/L) of the depletion-type transistor to the ratio (W/L) of the enhancement-type transistor) is referred to as a "size ratio". That is, $W_{ND}/L_{ND}$ is X times larger than $W_{NE}/L_{NE}$. If ID1 is equal to ID2, the gate-source voltage of the transistor 102 ($V_{GS}$) can be represented by the following equation (4) based on the equations (1) to (3).

$$\frac{1}{2}\mu_{ND}C_{OX}X\frac{W_{NE}}{L_{NE}}(-Vthnd)^2 = \frac{1}{2}\mu_{NE}C_{OX}\frac{W_{NE}}{L_{NE}}(V_{GS}-Vthne)^2 \quad (4)$$

$$\sqrt{\mu_{ND}X\frac{W_{NE}}{L_{NE}}} \cdot |Vthnd| = \sqrt{\mu_{NE}\frac{W_{NE}}{L_{NE}}} \cdot |(V_{GS}-Vthne)|$$

$$\sqrt{X\frac{\mu_{ND} \cdot W_{NE} \cdot L_{NE}}{\mu_{NE} \cdot W_{NE} \cdot L_{NE}}} \cdot |Vthnd| = (V_{GS}-Vthne)$$

$$V_{GS} = \sqrt{X\frac{\mu_{ND}}{\mu_{NE}}} \cdot |Vthnd| + Vthne$$

Because the gate-source voltage ($V_{GS}$) of the transistor 102 corresponds to the reference voltage VREF, the reference voltage VREF can be represented by the following equation (5).

$$VREF = \sqrt{X\frac{\mu_{ND}}{\mu_{NE}}} \cdot |Vthnd| + Vthne \quad (5)$$
$$= \sqrt{A} \cdot |Vthnd| + Vthne$$

The equation (5) indicates that the reference voltage source 1000 can output a constant reference voltage VREF regardless of voltage of the power supply.

Figure 2:
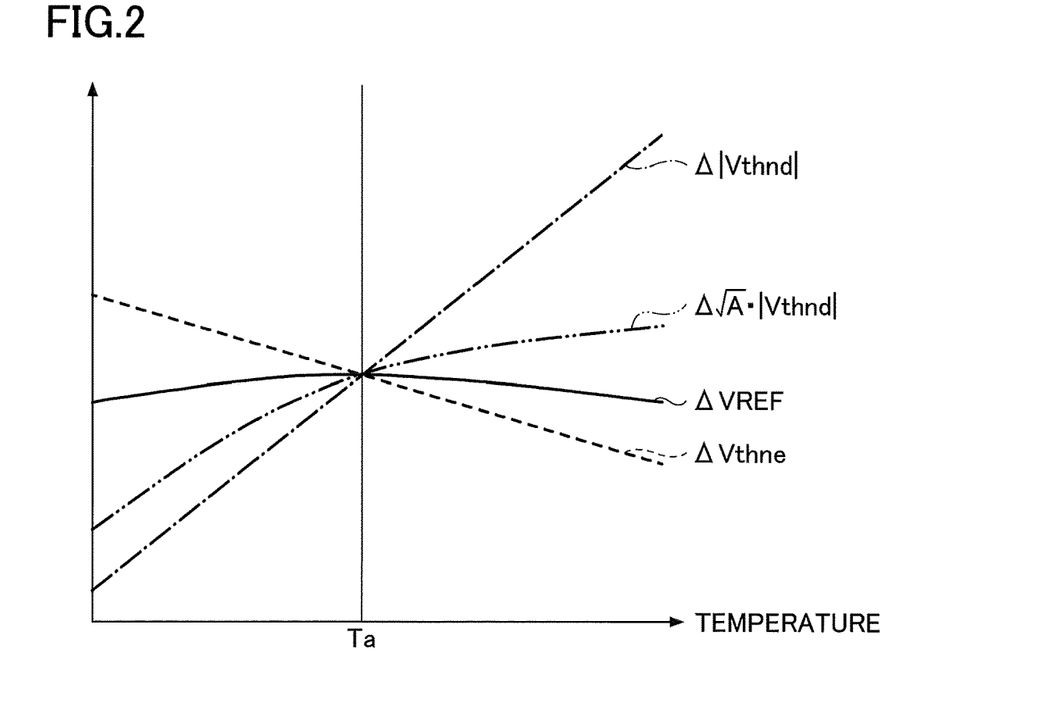
FIG. 2 is a schematic diagram illustrating an example of a temperature characteristic of a reference voltage.

FIG. 2 is a schematic diagram illustrating an example of a temperature characteristic of the reference voltage VREF represented by the equation (5). $T_a$ represents a reference temperature (e.g., 25° C.). A curve "ΔVREF" represents a difference from the reference voltage VREF at the reference temperature $T_a$ (variation of the reference voltage VREF), a curve "Δ|Vthnd|" represents a difference from threshold voltage |Vthnd| (i.e., an absolute value of the threshold voltage Vthnd) at the reference temperature $T_a$ (variation of the threshold voltage Vthnd), and a curve "ΔVthne" represents a difference from the threshold voltage Vthne at the reference temperature $T_a$ (variation of the threshold voltage Vthne). $\sqrt{A}$ denotes $$\sqrt{X\frac{\mu_{ND}}{\mu_{NE}}}$$

in the equation (5).

Each of the threshold voltages Vthnd and Vthne and the electron mobilities $\mu_{ND}$ and $\mu_{NE}$ is temperature dependent, whose magnitude varies in accordance with temperature. The ΔVthne has a negative temperature characteristic whose magnitude decreases as a temperature rises, and the Δ|Vthnd| has a positive temperature characteristic whose magnitude increases as a temperature rises. Curvature of a curve $\sqrt{A} \cdot |Vthnd|$ in FIG. 2 is caused by the temperature characteristics of $\mu_{ND}$ and $\mu_{NE}$.

With respect to the right side of the equation (5), the |Vthnd| of the first term has a positive temperature characteristic, and the threshold voltage Vthne of the second term has a negative temperature characteristic (the threshold voltage Vthne has a negative temperature characteristic). Accordingly, the temperature characteristic of the reference voltage VREF can be set to the least temperature dependent condition by designing $\sqrt{A}$ (more specifically, the size ratio X) in the equation (5) to an optimum value.

However, when a semiconductor circuit having a reference voltage source is actually manufactured, threshold voltage of transistors may vary depending on manufacturing variation of devices or the like, and an optimal design value of the size ratio X may differ in each semiconductor circuit (product).

Figure 3:
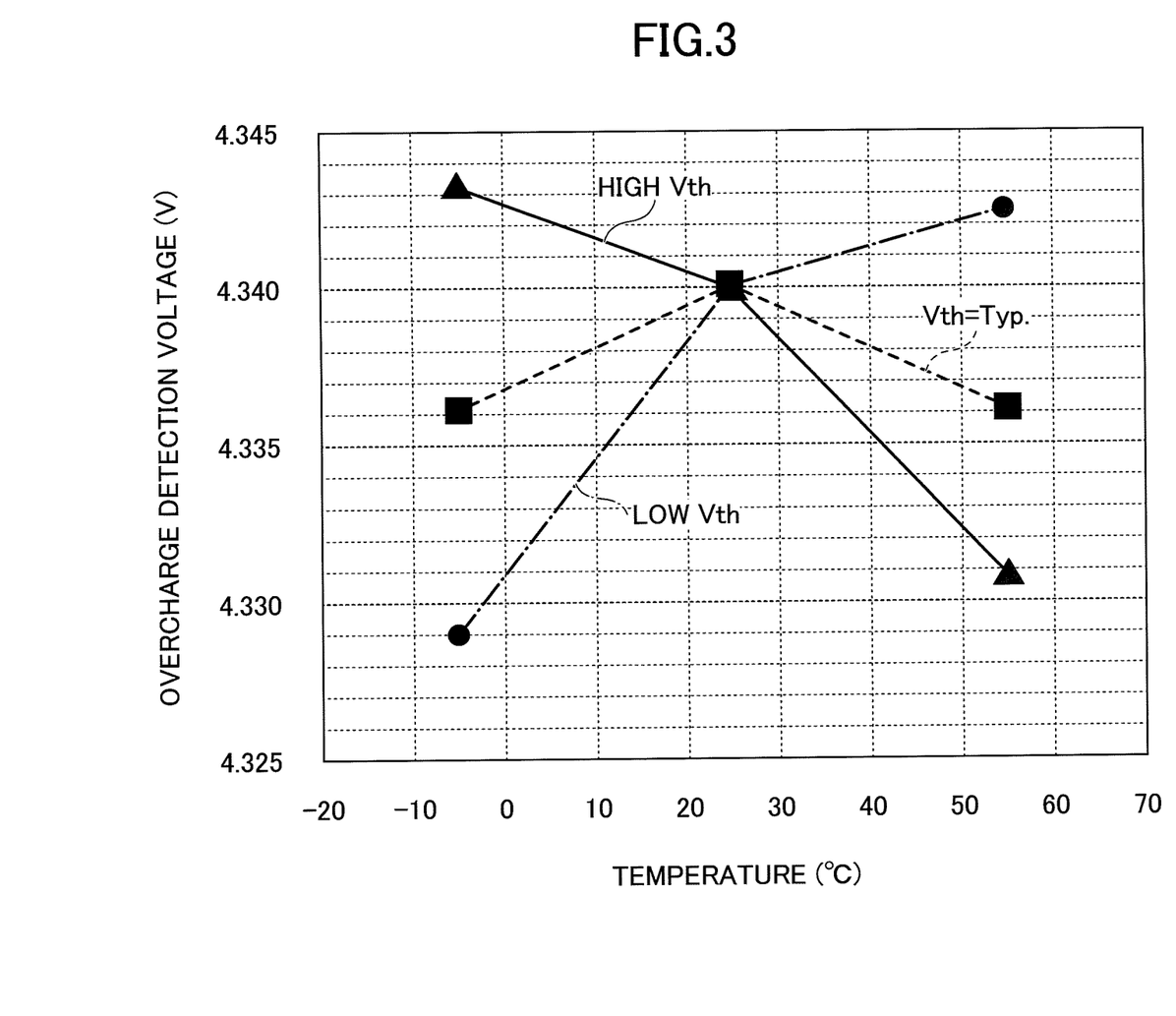
FIG. 3 is a diagram illustrating an example of a temperature characteristic of an overcharge detection voltage.

For example, FIG. 3 illustrates an example of variation in a temperature characteristic of an overcharge detection voltage, which is caused by the variation in the threshold voltage Vthnd of the depletion-type NMOS transistor 101. FIG. 3 illustrates temperature characteristic data of an overcharge detection voltage in a battery protection circuit that protects a secondary battery. The overcharge detection voltage is a threshold used to detect overcharging of the secondary battery.

Figure 4:
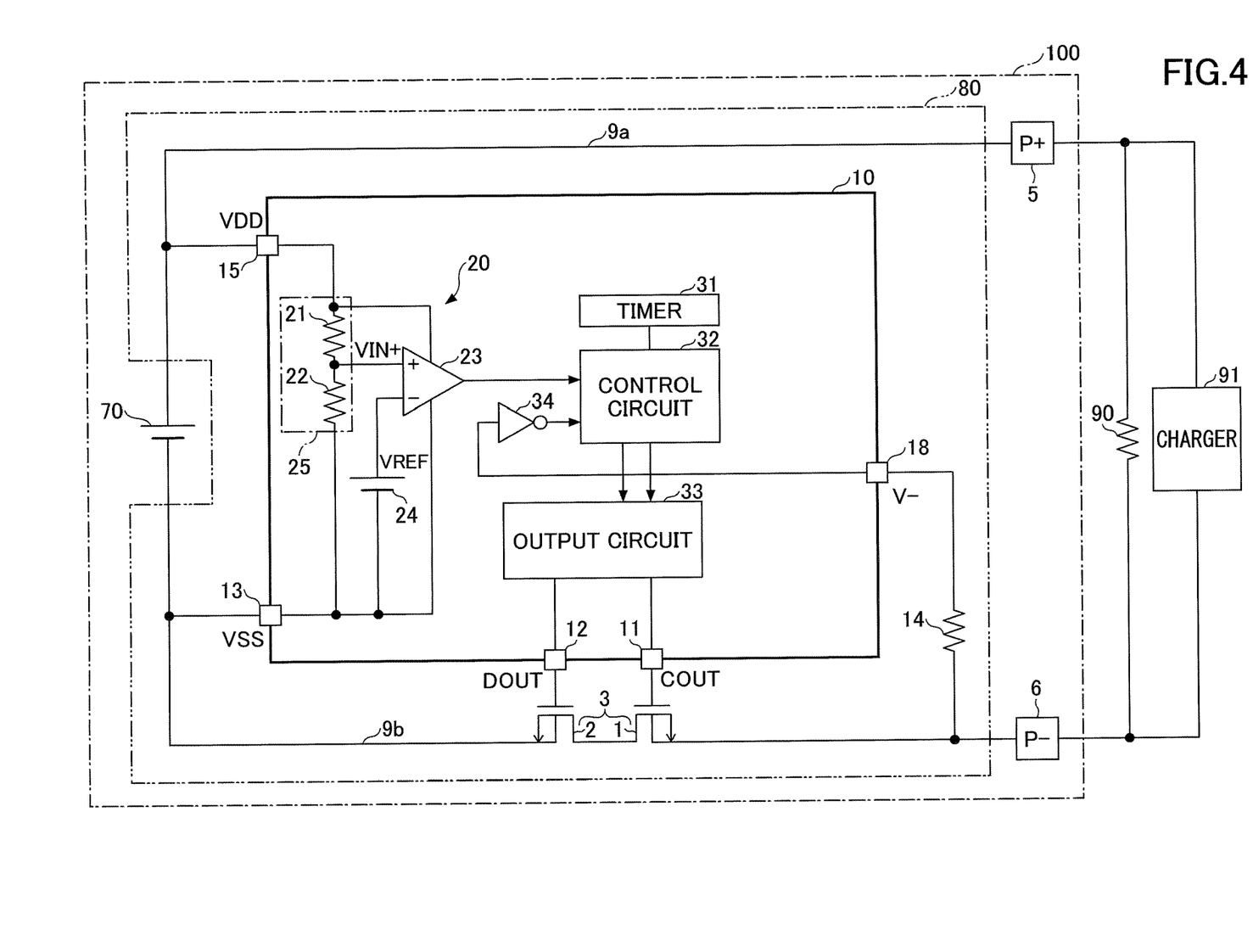
FIG. 4 is a diagram illustrating an example of a configuration of a battery pack including a secondary battery protection circuit according to the present embodiment.

For example, in a battery protection circuit 10 illustrated in FIG. 4, when a voltage (may be referred to as a power supply voltage Vd) between a VDD terminal and a VSS terminal that are connected to a secondary battery 70 increases, a detection voltage VIN+ obtained by dividing the power supply voltage Vd by a voltage divider composed of resistors 21 and 22 also increases. If the detection voltage VIN+ exceeds the reference voltage VREF generated by a reference voltage circuit 24, an output of a comparator 23 in a detection circuit 20 is reversed. The magnitude of the power supply voltage Vd at a time when the output of the comparator 23 is reversed is referred to as the overcharge detection voltage. That is, the overcharge detection voltage has a characteristic proportional to the reference voltage VREF, and a temperature characteristic of the overcharge detection voltage has a temperature characteristic similar to that of the reference voltage VREF.

In FIG. 3, a curve "Vth=Typ." indicates data in a case in which the reference voltage VREF is generated by using a transistor 101 whose threshold voltage Vthnd is equal to a typical value in the reference voltage source 1000. A curve "High Vth" indicates data in a case in which the reference voltage VREF is generated by using a transistor 101 whose threshold voltage Vthnd is higher than the typical value in the reference voltage source 1000. A curve "Low Vth" indicates data in a case in which the reference voltage VREF is generated by using a transistor 101 whose threshold voltage Vthnd is lower than the typical value.

As can be seen from FIG. 3, because of manufacturing variation of the threshold voltage Vthnd of the depletion-type NMOS transistor 101, variation in the temperature characteristic of the reference voltage VREF occurs in each product. As a result, variation in the temperature characteristic of the overcharge detection voltage occurs in each product.

The reference voltage circuit in the present embodiment is configured to be able to reduce variation in the temperature characteristic of the reference voltage VREF caused by manufacturing variation. Next, a configuration of the present embodiment will be described.

Figure 5:
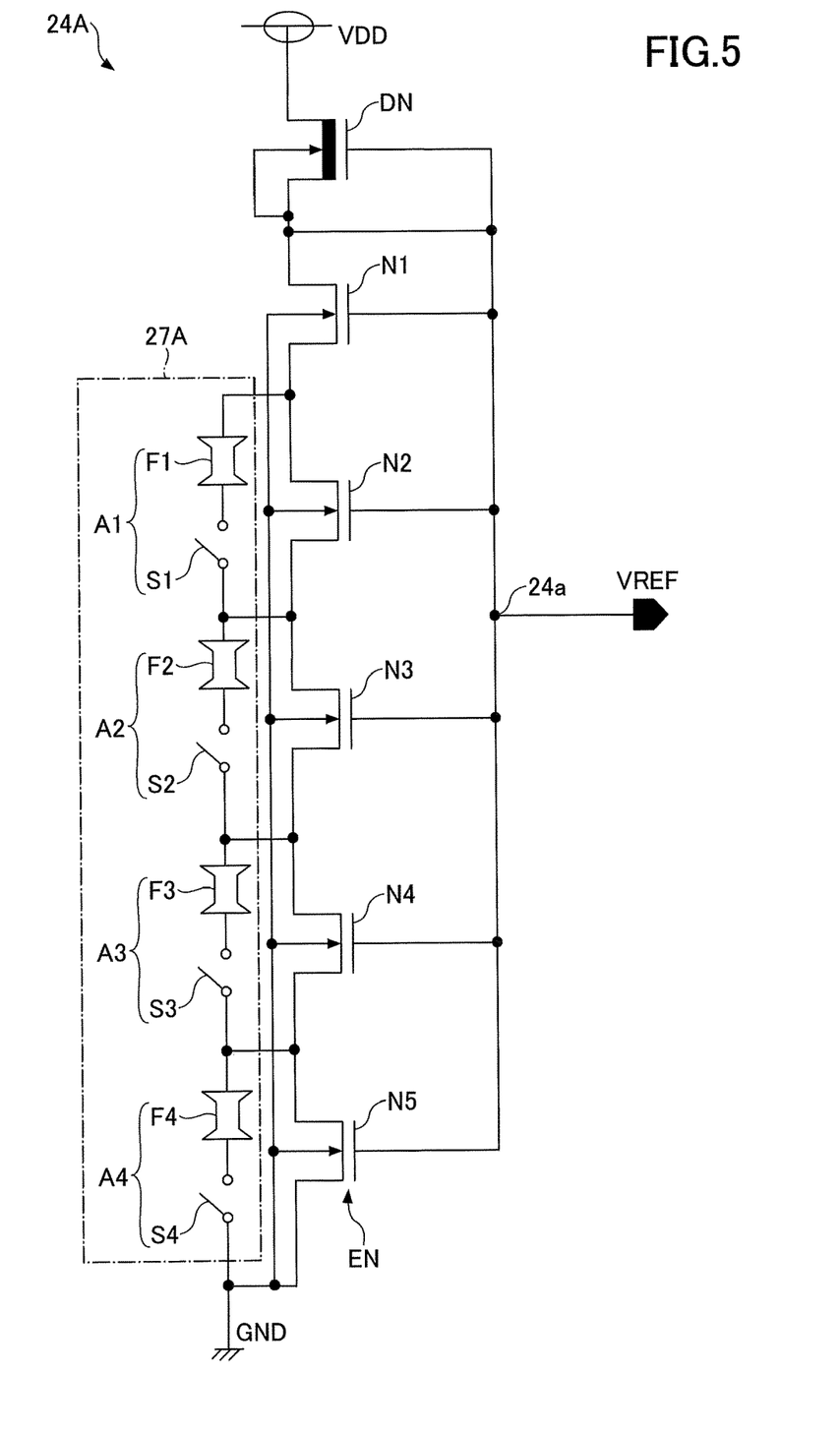
FIG. 5 is a diagram illustrating a first configuration example of a reference voltage circuit according to the present embodiment.

FIG. 5 is a diagram illustrating a first configuration example of a reference voltage circuit according to the present embodiment. The reference voltage circuit 24A can output a constant reference voltage VREF independent of variation in a power supply voltage (potential difference between a high potential section of power supply VDD and a low potential section of power supply GND). An electrical potential at the low potential section of power supply GND is lower than that at the high potential section of power supply VDD.

The reference voltage circuit 24A uses a first transistor DN (first transistor unit) of depletion type and a second transistor EN (second transistor unit) of enhancement type connected in series with the first transistor DN, to generate the constant reference voltage VREF. The first transistor DN is a depletion-type NMOS transistor, and the second transistor EN is an enhancement-type NMOS transistor. The first transistor DN and the second transistor EN are connected in series between the high potential section of power supply VDD and the low potential section of power supply GND. The second transistor EN includes multiple transistors connected in series. That is, a set of the multiple transistors (such as transistors N1 to N5 in FIG. 5) included in the second transistor EN is regarded as a single transistor unit (second transistor EN). Although FIG. 5 illustrates a case in which the second transistor EN includes five transistors N1 to N5, the number of transistors connected in series is not limited to this case.

In the embodiment illustrated in FIG. 5, the drain of the first transistor DN is connected to the high potential section of power supply VDD, the source of the first transistor DN is connected to the second transistor EN, and the gate is connected to a node 24a. The gate, the source, and the back gate of the first transistor DN are connected with each other.

The second transistor EN includes a main transistor connected in series with the first transistor DN, and multiple sub transistors connected in series with the main transistor. The main transistor and the sub transistors are enhancement-type transistors. The reference voltage circuit 24A generates the constant reference voltage VREF output from the node 24a, by using at least the first transistor DN and the main transistor connected in series with the first transistor DN.

In the present embodiment, the second transistor EN includes the main transistor N1 and the four sub transistors N2 to N5 connected in series with the main transistor N1. Each gate of the main transistor N1 and the sub transistors N2 to N5 is commonly connected to the node 24a. Each back gate of the main transistor N1 and the sub transistors N2 to N5 is commonly connected to the low potential section of power supply GND. The drain of the main transistor N1, which is located at a side of the highest potential among the multiple transistors included in the second transistor EN, is connected to the source of the first transistor DN. The source of the sub transistor N5, which is located at a side of the lowest potential of among the multiple transistors included in the second transistor EN, is connected to the low potential section of power supply GND.

The reference voltage circuit 24A has multiple switch circuits A1 to A4 provided for the multiple sub transistors N2 to N5 respectively. Each of the switch circuits A1 to A4 is connected in parallel with a corresponding sub transistor among the sub transistors N2 to N5. Each of the switch circuits A1 to A4 includes a switch element and a fuse element connected in series to the switch element. For example, the switch element is a MOS transistor that is turned on or off by a signal supplied to the switch element, and the fuse element is a conductor link that can be cut by laser emitted from outside of a semiconductor circuit (including the reference voltage circuit 24A).

In the case of FIG. 5, one end of the switch circuit A1, including a switch element S1 and a fuse element F1 connected in series with the switch element S1, is connected to the drain of the sub transistor N2, and the other end of the switch circuit A1 is connected to the source of the sub transistor N2. One end of the switch circuit A2, having a switch element S2 and a fuse element F2 connected in series with the switch element S2, is connected to the drain of the sub transistor N3, and the other end of the switch circuit A2 is connected to the source of the sub transistor N3. One end of the switch circuit A3, having a switch element S3 and a fuse element F3 connected in series with the switch element S3, is connected to the drain of the sub transistor N4, and the other end of the switch circuit A3 is connected to the source of the sub transistor N4. One end of the switch circuit A4, having a switch element S4 and a fuse element F4 connected in series with the switch element S4, is connected to the drain of the sub transistor N5, and the other end of the switch circuit A4 is connected to the source of the sub transistor N5.

That is, the reference voltage circuit 24A includes a circuit composed of the switch circuits A1 to A4, which is capable of adjusting the channel length L of the second transistor EN with a switch element or a fuse element. The circuit composed of the switch circuits A1 to A4 is referred to as an adjustment circuit 27A. The adjustment circuit 27A changes the channel length L of the second transistor EN by disconnecting any of the switch circuits with a switch element or fuse element, each of which is connected in parallel to a corresponding sub transistor of the sub transistors N2 to N5. As the number of disconnected switch circuits among the switch circuits A1 to A4 increases, the channel length L of the second transistor EN increases.

The switch element S1 is provided so that the channel length L of the second transistor EN can be changed before the fuse element F1 connected in parallel with the sub transistor N2 is cut. However, after cutting the fuse element F1, the channel length L of the second transistor EN is not changed by the switch element S1. The same applies to the switch elements S2 to S4.

By changing the channel length L of the second transistor EN as described above, the adjustment circuit 27A adjusts the size ratio X (see the equation (3) described above) of the ratio (W/L) of the first transistor DN to the ratio (W/L) of the second transistor EN. Because the adjustment circuit 27A is configured to be able to adjust the size ratio X, the adjustment circuit 27A can select an optimum size ratio X that can reduce effect of variation in the temperature characteristic of the reference voltage VREF caused by manufacturing variation of the threshold voltages of the first transistor DN and second transistor EN.

After the size ratio X to be selected is determined, one or more fuse elements of the fuse elements F1 to F4 are cut by laser cutting prior to product shipment, in order to adjust the size ratio X to the determined size ratio X. Thus, even after the product shipment, the reference voltage circuit 24A can generate a reference voltage VREF in which variation in the temperature characteristic is reduced.

Figure 6:
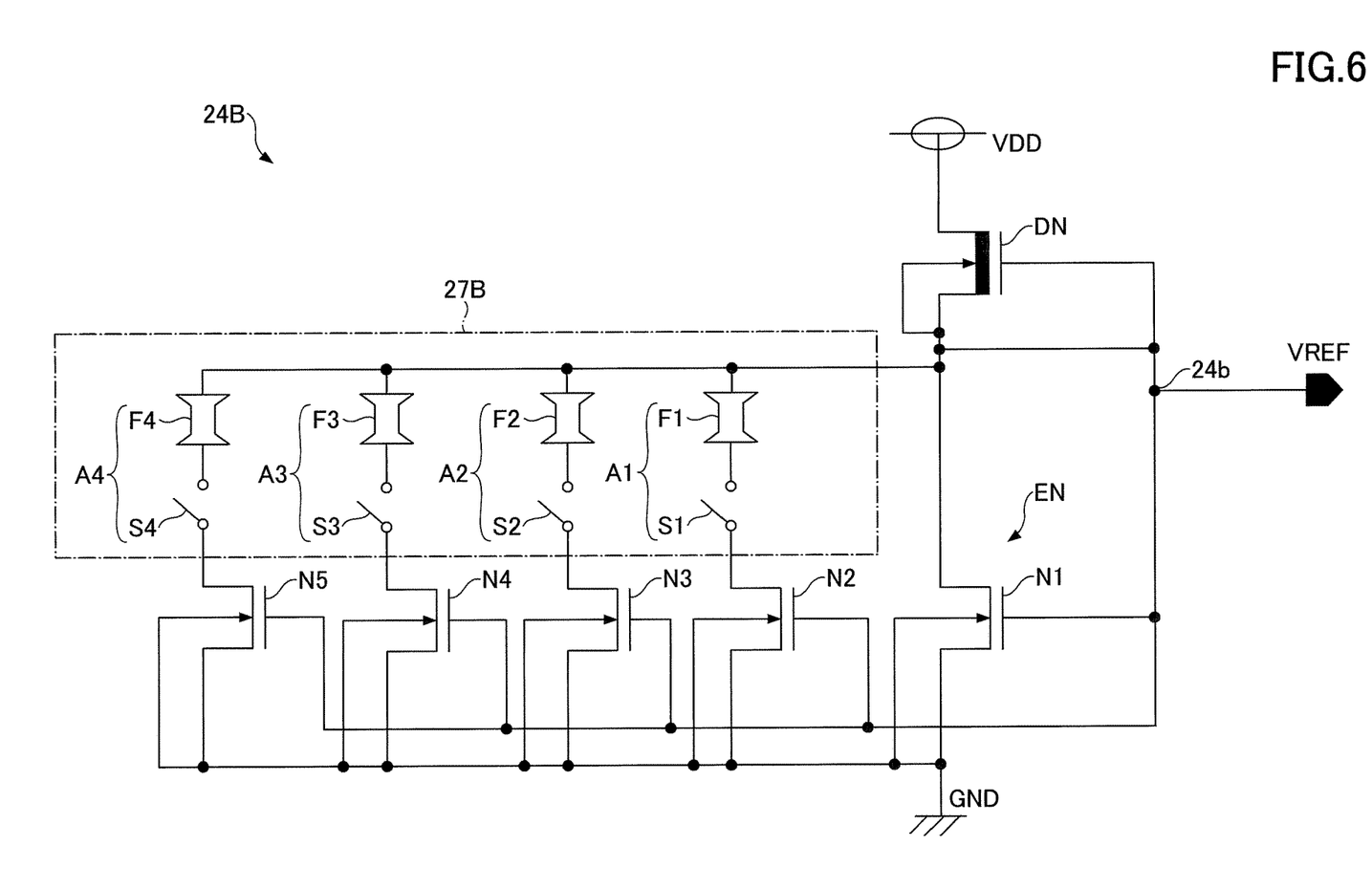
FIG. 6 is a diagram illustrating a second configuration example of the reference voltage circuit according to the present embodiment.

FIG. 6 is a diagram illustrating a second configuration example of the reference voltage circuit according to the present embodiment. The reference voltage circuit 24B can output a constant reference voltage VREF independent of variation in a power supply voltage (potential difference between a high potential section of power supply VDD and a low potential section of power supply GND). An electrical potential at the low potential section of power supply GND is lower than that at the high potential section of power supply VDD.

The reference voltage circuit 24B uses a first transistor DN (first transistor unit) of depletion type and a second transistor EN (second transistor unit) of enhancement type connected in series with the first transistor DN, to generate the constant reference voltage VREF. The first transistor DN is a depletion-type NMOS transistor, and the second transistor EN is an enhancement-type NMOS transistor. The first transistor DN and the second transistor EN are connected in series between the high potential section of power supply VDD and the low potential section of power supply GND. The second transistor EN includes multiple transistors connected in parallel. That is, a set of the multiple transistors (transistors N1 to N5 in FIG. 6) included in the second transistor EN is regarded as a single transistor unit (second transistor EN). FIG. 6 illustrates a case in which the second transistor EN includes five transistors N1 to N5, but the number of transistors connected in parallel is not limited to this case.

In the embodiment illustrated in FIG. 6, the drain of the first transistor DN is connected to the high potential section of power supply VDD, the source of the first transistor DN is connected to the second transistor EN, and the gate of the first transistor DN is connected to a node 24b. The gate, the source, and the back gate of the first transistor DN are connected with each other.

The second transistor EN includes a main transistor connected in series with the first transistor DN, and multiple sub transistors connected in parallel with the main transistor. The main transistor and the sub transistors are enhancement-type transistors. The reference voltage circuit 24B generates the constant reference voltage VREF output from the node 24b, by using at least the first transistor DN and the main transistor connected in series with the first transistor DN.

In the present embodiment, the second transistor EN includes the main transistor N1 and the four sub transistors N2 to N5 connected in parallel with the main transistor N1. Each gate of the main transistor N1 and the sub transistors N2 to N5 is commonly connected to the node 24b. The back gate and the source of each of the main transistor N1 and the sub transistors N2 to N5 are commonly connected to the low potential section of power supply GND. The drain of the main transistor N1 is connected to the source of the first transistor DN without going through a switch circuit. The drain of each of the sub transistors N2 to N5 is connected to the source of the first transistor DN via a corresponding switch circuit.

The reference voltage circuit 24B has multiple switch circuits A1 to A4 provided for the multiple sub transistors N2 to N5 respectively. Each of the switch circuits A1 to A4 is connected in series with the corresponding sub transistor among the sub transistors N2 to N5. Each of the switch circuits A1 to A4 includes a switch element and a fuse element connected in series to the switch element. For example, the switch element is a MOS transistor that is turned on or off by a signal supplied to the switch element, and the fuse element is a conductor link that can be cut by laser emitted from outside of a semiconductor circuit (including the reference voltage circuit 24B).

In the case of FIG. 6, one end of the switch circuit A1, having a switch element S1 and a fuse element F1 connected in series with the switch element S1, is connected to the drain of the sub transistor N2, and the other end of the switch circuit A1 is connected to the source of the first transistor DN. One end of the switch circuit A2, having a switch element S2 and a fuse element F2 connected in series with the switch element S2, is connected to the drain of the sub transistor N3, and the other end of the switch circuit A2 is connected to the source of the first transistor DN. One end of the switch circuit A3, having a switch element S3 and a fuse element F3 connected in series with the switch element S3, is connected to the drain of the sub transistor N4, and the other end of the switch circuit A3 is connected to the source of the first transistor DN. One end of the switch circuit A4, having a switch element S4 and a fuse element F4 connected in series with the switch element S4, is connected to the drain of the sub transistor N5, and the other end of the switch circuit A4 is connected to the source of the first transistor DN.

That is, the reference voltage circuit 24B includes a circuit composed of the switch circuits A1 to A4, which is capable of adjusting the channel width W of the second transistor EN with a switch element or fuse element. The circuit composed of the switch circuits A1 to A4 is referred to as an adjustment circuit 27B. The adjustment circuit 27B changes the channel width W of the second transistor EN by disconnecting any of the switch circuits with a switch element or fuse element, each of which is connected in series to a corresponding sub transistor of the sub transistors N2 to N5. As the number of disconnected switch circuits among the switch circuits A1 to A4 increases, the channel width W of the second transistor EN is reduced.

The switch element S1 is provided so that the channel width W of the second transistor EN can be changed before the fuse element F1 connected in series with the sub transistor N2 is cut. However, after cutting the fuse element F1, the channel width W of the second transistor EN is not changed by the switch element S1. The same applies to the switch elements S2 to S4.

By changing the channel width W of the second transistor EN as described above, the adjustment circuit 27B adjusts the size ratio X (see the above-described equation (3)) of the ratio (W/L) of the first transistor DN to the ratio (W/L) of the second transistor EN. Because the adjustment circuit 27B is configured to be able to adjust the size ratio X, the adjustment circuit 27B can select an optimum size ratio X that can reduce effect of variation in the temperature characteristic of the reference voltage VREF caused by manufacturing variation of the threshold voltages of the first transistor DN and second transistor EN.

After the size ratio X to be selected is determined, one or more fuse elements of the fuse elements F1 to F4 are cut by laser cutting prior to product shipment, in order to adjust the size ratio X to the determined size ratio X. Thus, even after the product shipment, this allows the reference voltage circuit 24B to generate the reference voltage VREF in which variation in the temperature characteristic is reduced.

Figure 7:
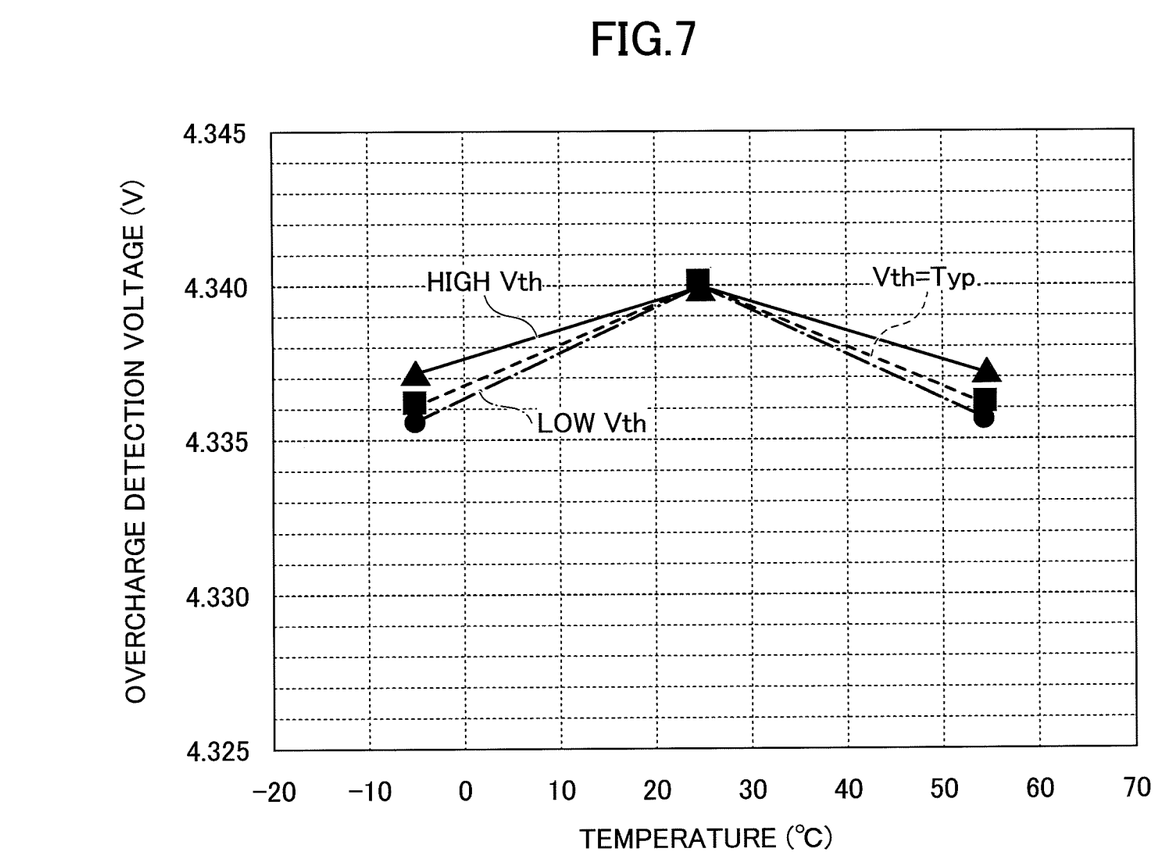
FIG. 7 is a diagram illustrating a temperature characteristic of the overcharge detection voltage after adjusting the temperature characteristic of the reference voltage.

FIG. 7 is a diagram illustrating a temperature characteristic of an overcharge detection voltage after variation in the temperature characteristic of the reference voltage VREF has been reduced by means of the adjustment circuit 27A. As can be seen from FIG. 6, variation in the temperature characteristic of the overcharge detection voltage is reduced, as compared to FIG. 3.

Next, a configuration of a secondary battery protection circuit for protecting a secondary battery using an overcharge detection voltage, and a configuration of a battery pack including the secondary battery protection circuit will be described.

FIG. 4 is a diagram illustrating an example of the configuration of the battery pack including the secondary battery protection circuit according to the present embodiment. The battery pack 100 illustrated in FIG. 4 includes the secondary battery 70 and a battery protection device 80.

The secondary battery 70 is an example of a rechargeable and dischargeable battery. The secondary battery 70 supplies power to a load 90 connected to a positive terminal 5 (P+ terminal) and a negative terminal 6 (P− terminal). The secondary battery 70 can be charged by a charger 91 connected to the positive terminal 5 and the negative terminal 6. Examples of the secondary battery 70 include a lithium-ion battery and a lithium-polymer battery. The battery pack 100 may be embedded in the load 90, or may be attached to the load 90 externally.

The load 90 is an example of a load powered by the secondary battery 70 of the battery pack 100. Examples of the load 90 include an electrical appliance such as an electric tool, and electronic equipment such as a portable terminal device. Examples of the electronic equipment include a cellular phone, a smartphone, a computer, a game device, a television, and a camera. The load 90 is not limited to these devices.

The battery protection device 80 is an example of a secondary battery protection device powered by the secondary battery 70, and protects the secondary battery 70 from overcharging, overdischarging, or the like, by controlling the charging and discharging of the secondary battery 70. The battery protection device 80 includes the positive terminal 5, the negative terminal 6, a switch circuit 3, and the battery protection circuit 10.

The positive terminal 5 is an example of a terminal to which a terminal of the load 90 or a power supply terminal of the charger 91 may be connected. The negative terminal 6 is an example of a terminal to which ground of the load 90 or the charger 91 may be connected.

The positive electrode of the secondary battery 70 and the positive terminal 5 are connected via a positive current path 9a, and the negative electrode of the secondary battery 70 and the negative terminal 6 are connected via a negative current path 9b. The positive current path 9a is an example of a charging/discharging current path between the positive electrode of the secondary battery 70 and the positive terminal 5, and the negative current path 9b is an example of a charging/discharging current path between the negative electrode of the secondary battery 70 and the negative terminal 6. The negative current path 9b may also be referred to as a "current path 9b".

The switch circuit 3 is inserted, in series, into the current path 9b between the negative electrode of the secondary battery 70 and the negative terminal 6 which may be connected to the ground of the load 90 or the charger 91.

The switch circuit 3 includes, for example, a charge control transistor 1 and a discharge control transistor 2. The charge control transistor 1 is an example of a charging path disconnecting section for disconnecting a charging path of the secondary battery 70, and the discharge control transistor 2 is an example of a discharging path disconnecting section for disconnecting a discharging path of the secondary battery 70. In the case of FIG. 4, the charge control transistor 1 disconnects the current path 9b through which charging current for the secondary battery 70 flows, and the discharge control transistor 2 disconnects the current path 9b through which discharging current of the secondary battery 70 flows. The charge control transistor 1 and the discharge control transistor 2 are switching elements that switch between a conduction state and a disconnection state of the current path 9b, and are inserted in series into the current path 9b. The charge control transistor 1 and the discharge control transistor 2 are, for example, N-channel metal oxide semiconductor (NMOS) transistors.

The battery protection circuit 10 is an example of a secondary battery protection circuit. The battery protection circuit 10 protects the secondary battery 70 by turning off the switch circuit 3. The battery protection circuit 10 is an integrated circuit (IC) that operates with a battery voltage (also referred to as a "cell voltage") between the positive and negative electrodes of the secondary battery 70. The battery protection circuit 10 includes, for example, a charge control terminal 11 (COUT terminal), a discharge control terminal 12 (DOUT terminal), a monitoring terminal 18 (V− terminal), a power supply terminal 15 (VDD terminal), and a ground terminal 13 (VSS terminal).

The COUT terminal is connected to the gate of the charge control transistor 1, and outputs a signal for turning on or off the charge control transistor 1. The DOUT terminal is connected to the gate of the discharge control transistor 2, and outputs a signal for turning on or off the discharge control transistor 2.

The V− terminal is connected to the negative terminal 6, and is used to monitor an electrical potential of the negative terminal 6. The V− terminal is used, for example, in order that a control circuit 32 (to be described below) monitors whether or not the load 90 or the charger 91 is connected, and is connected to a point in the negative current path 9b between the charge control transistor 1 and the negative terminal 6, via a resistor 14.

The VDD terminal is a power supply terminal of the battery protection circuit 10, and is connected to the positive electrode of the secondary battery 70 and the positive current path 9a. The VSS terminal is a ground terminal of the battery protection circuit 10, and is connected to the negative electrode of the secondary battery 70 and the negative current path 9b.

The battery protection circuit 10 is an integrated circuit that monitors a state of the secondary battery 70 and that protects the secondary battery 70 when an abnormal state of the secondary battery 70, such as overcharging or overdischarging, is detected. The battery protection circuit 10 protects the secondary battery 70 from charging abnormality, such as overcharging, by turning off the charge control transistor 1, and protects the secondary battery 70 from discharging abnormality, such as over-discharging, or a short circuit abnormality, by turning off the discharge control transistor 2. The battery protection circuit 10 includes, for example, the control circuit 32, an output circuit 33, a timer 31, and the detection circuit 20.

For example, if overcharging of the secondary battery 70 or overcurrent to the secondary battery 70 is continuously detected for a predetermined period of time (the predetermined period of time may also be referred to as a "continuous time"), the control circuit 32 outputs a signal for turning off the charge control transistor 1 (e.g., a gate control signal of low level) from the COUT terminal through the output circuit 33. By turning off the charge control transistor 1, the control circuit 32 prevents current from flowing through the current path 9b, in a direction of charging the secondary battery 70. As a result, charging of the secondary battery 70 is stopped, and the secondary battery 70 can be protected from overcharging or overcurrent for charging.

For example, if overdischarging of the secondary battery 70 or overcurrent discharged from the secondary battery 70 is continuously detected for a predetermined period of time, the control circuit 32 outputs a signal for turning off the discharge control transistor 2 (e.g., a gate control signal of low level) from the DOUT terminal through the output circuit 33. By turning off the discharge control transistor 2, the control circuit 32 prevents current from flowing through the current path 9b in a direction of discharging the secondary battery 70. As a result, discharging of the secondary battery 70 is stopped and the secondary battery 70 can be protected from overdischarging or over current for discharging.

The control circuit 32 is configured, for example, by multiple analog logic circuits, without using a CPU (Central Processing Unit).

The output circuit 33 is a circuit for driving the switch circuit 3. More specifically, the output circuit 33 includes a drive circuit section for driving the charge control transistor 1 and a drive circuit section for driving the discharge control transistor 2.

The timer 31 is used to measure the aforementioned continuous time, and includes, for example, a counter circuit that counts a predetermined pulse signal to be input.

The detection circuit 20 monitors the power supply voltage Vd, which is voltage between the VDD terminal and the VSS terminal. Because the VDD terminal is connected to the positive electrode of the secondary battery 70 and the VSS terminal is connected to the negative electrode of the secondary battery 70, the power supply voltage Vd is approximately equal to cell voltage of the secondary battery 70. Thus, the detection circuit 20 can detect the cell voltage of the secondary battery 70 by monitoring the power supply voltage Vd.

The detection circuit 20 may include a monitor circuit 34 that monitors electrical potential of the V-terminal and outputs the monitored result to the control circuit 32. The monitor circuit 34 is, for example, a CMOS (Complementary MOS) inverter. The monitor circuit 34 may be a circuit that monitors an electrical potential of the V− terminal using a comparator. The detection circuit 20 monitors a monitoring voltage V−, which is voltage of the V− terminal with respect to the VSS terminal as a reference potential.

The detection circuit 20 detects an abnormal condition of the secondary battery 70, such as overcharging, based on the reference voltage VREF and a detection voltage VIN+.

In order to detect overcharging of the secondary battery 70, the detection circuit 20 includes, for example, a voltage divider 25, the reference voltage circuit 24, and a comparator 23. The voltage divider 25 includes a resistor 21 and a resistor 22 connected in series, and the resistors 21 and 22 are connected between the VDD terminal and the VSS terminal. The reference voltage circuit 24 is a circuit that generates the constant reference voltage VREF. The reference voltage circuit 24A (FIG. 5) or the reference voltage circuit 24B (FIG. 6) described above is an example of a reference voltage circuit 24.

The voltage divider 25 divides the power supply voltage Vd, which is the voltage between the VDD terminal and the VSS terminal, by the resistors 21 and 22, and outputs the detection voltage VIN+ obtained by dividing the power supply voltage Vd. The comparator 23 compares the detection voltage VIN+ generated by the voltage divider 25 with the reference voltage VREF generated by the reference voltage circuit 24, and outputs a result of the comparison to the control circuit 32.

An output signal of the comparator 23 is inverted from a non-active level (e.g., low level) to an active level (e.g., high level) when the detection voltage VIN+ exceeds the reference voltage VREF. The power supply voltage Vd at a time of occurrence of the inversion from the non-active level to the active level is referred to as an overcharge detection voltage Vdet1. Note that the comparator 23 implements hysteresis. Thus, when the detection voltage VIN+ drops below the reference voltage VREF, the output signal of the comparator 23 is inverted from the active level (e.g., high level) to the non-active level (e.g., low level). The power supply voltage Vd at the time of occurrence of the inversion from the active level to the non-active level is referred to as an overcharging recovery voltage Vrel1. The overcharging recovery voltage Vrel1 is lower than the overcharge detection voltage Vdet1.

When a power supply voltage Vd higher than the overcharge detection voltage Vdet1 is detected by the comparator 23, the detection circuit 20 outputs an active level signal to the control circuit 32, which represents a state in which overcharging of the secondary battery 70 is detected. Conversely, when a power supply voltage Vd lower than the overcharging recovery voltage Vrel1 is detected by the comparator 23, the detection circuit 20 outputs a non-active level signal indicating that the overcharging of the secondary battery 70 is not detected.

Figure 8:
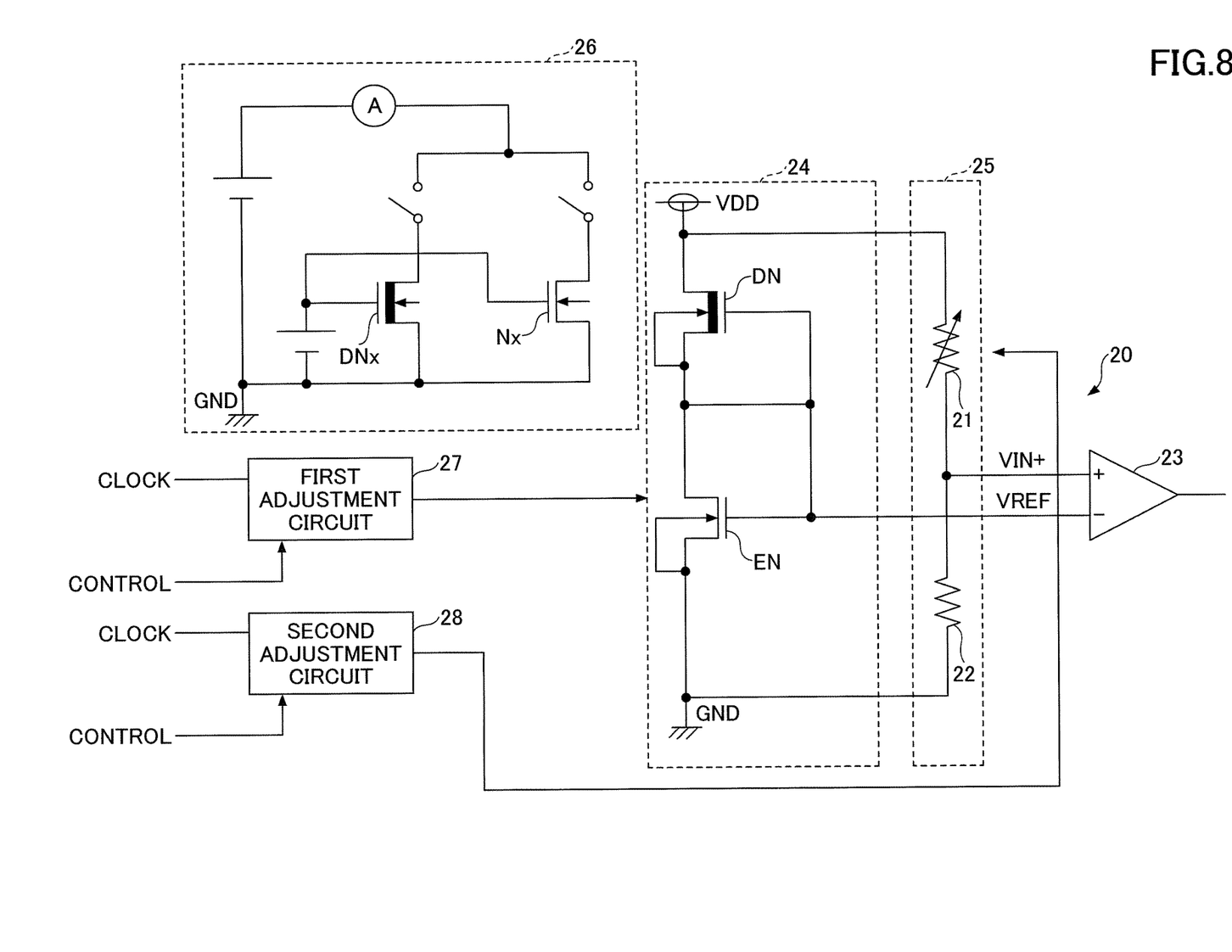
FIG. 8 is a diagram illustrating a configuration that reduces variation in the overcharge detection voltage caused by the variation in the temperature characteristic of the reference voltage.

FIG. 8 is a diagram illustrating a configuration that reduces variation in the overcharge detection voltage Vdet1 caused by the variation in the reference voltage VREF. The temperature characteristic of the reference voltage VREF mainly varies depending on the threshold voltage Vthnd of the first transistor DN, the threshold voltage Vthne of the second transistor EN, and the size ratio X of the ratio (W/L) of the first transistor DN to the ratio (W/L) of the second transistor EN.

Therefore, if dummy circuit elements (transistors) are placed in the vicinity of the first transistor DN and the second transistor EN, variation in each of the threshold voltage Vthnd and the threshold voltage Vthne is monitored by using the dummy circuit elements, and the size ratio X is adjusted based on a result of the monitoring; accordingly, it is possible to adjust the temperature characteristic of the reference voltage VREF.

Specifically, the battery protection circuit 10 includes a monitor circuit 26 disposed in the vicinity of the reference voltage circuit 24. The monitor circuit 26 includes a first dummy element DNx disposed near the first transistor DN and a second dummy element Nx disposed near the main transistor N1 in the second transistor EN.

The first dummy element DNx is a depletion-type NMOS transistor formed in the same shape (e.g., the same ratio (W/L)) as the first transistor DN, in order to monitor manufacturing variation of the threshold voltage Vthnd of the first transistor DN. The second dummy element Nx is an enhancement-type NMOS transistor formed in the same shape (e.g., the same ratio (W/L)) as the main transistor N1, in order to monitor manufacturing variation of the threshold voltage Vthne of the main transistor N1 in the second transistor EN.

The battery protection circuit 10 further includes a first adjustment circuit 27 and a second adjustment circuit 28.

The first adjustment circuit 27 adjusts the size ratio X of the first transistor DN to the second transistor EN based on the threshold voltage Vthnd of the first transistor DN and the threshold voltage Vthne of the second transistor EN. The adjustment circuit 27A (FIG. 5) or the adjustment circuit 27B described above is an example of the first adjustment circuit 27.

The first adjustment circuit 27 adjusts the size ratio X by disconnecting any of the switch circuits each connected to a corresponding sub transistor among the multiple sub transistors N2 to N5. Each of the switch circuits includes a fuse element that can be cut after adjustment of the detection voltage VIN+ by the second adjustment circuit 28, and a switch element to vary the size ratio X before cutting the fuse element.

In addition to the above-described switch circuits (in the case of FIG. 5, switch circuits A1 to A4), the first adjustment circuit 27 includes a switch element control circuit for turning on and off each of the switch elements (in the case of FIG. 5, switch elements S1 to S4) in the switch circuits. The switch element control circuit includes, for example, a counter circuit, a data retention circuit, and the like.

The second adjustment circuit 28 adjusts the detection voltage VIN+ to a desired voltage based on the reference voltage VREF after the size ratio X is adjusted by the first adjustment circuit 27. For example, the detection voltage VIN+ may be adjusted such that the detection voltage VIN+ becomes greater than the reference voltage VREF (after the size ratio X is adjusted) when the power supply voltage Vd becomes equal to or greater than the overcharge detection voltage Vdet1. The second adjustment circuit 28 adjusts the detection voltage VIN+ by changing a division ratio of the power supply voltage Vd (division ratio of the voltage divider 25, which is a ratio of a resistance of the resistor 22 to a sum of a resistance of the resistor 21 and a resistance of the resistor 22). The second adjustment circuit 28 modifies the division ratio of the power supply voltage Vd (division ratio of the voltage divider 25) by varying magnitude of resistance of the resistor 21 for example.

The temperature characteristic of the reference voltage VREF varies depending on the threshold voltage Vthnd of the first transistor DN and the threshold voltage Vthne of the second transistor EN. Also, the temperature characteristic of the reference voltage VREF varies depending on the size ratio X of the ratio (W/L) of the first transistor DN to the ratio (W/L) of the second transistor EN.

Therefore, correspondence among the threshold voltage Vthnd, the threshold voltage Vthnd, and an optimal size ratio X (may also be the channel length L or the channel width W) capable of reducing variation in the temperature characteristic of the reference voltage VREF that corresponds to the threshold voltage Vthnd and the threshold voltage Vthnd is derived in advance, and data of the derived correspondence is stored in a memory in advance (hereinafter, the data stored in the memory in advance may be referred to as "table data"). A threshold voltage of the first dummy element DNx measured by the monitor circuit 26 may be regarded as the threshold voltage Vthnd prior to adjusting the size ratio X. A threshold voltage of the second dummy element Nx measured by the monitor circuit 26 may be regarded as the threshold voltage Vthne prior to adjusting the size ratio X.

Next, an operation of reducing variation in the temperature characteristic of the reference voltage VREF and reducing variation in the overcharge detection voltage Vdet1 will be described.

First, the monitor circuit 26 measures the threshold voltages Vthnd and Vthne before adjusting the size ratio X, based on a control signal from outside of the secondary battery protection circuit 10. The first adjustment circuit 27 adjusts the channel length L or the channel width W to an optimum value by turning off any of the switch elements S1 to S4, based on the threshold voltages Vthnd and Vthne measured by the monitor circuit 26 and the aforementioned table data. By performing this operation, the size ratio X is adjusted to an optimum value that reduces variation in the temperature characteristic of the reference voltage VREF.

Next, the second adjustment circuit 28 adjusts magnitude of the resistance of the resistor 21 so that the detection voltage VIN+ becomes equal to the desired voltage (e.g., the detection voltage VIN+ becomes equal to the reference voltage; in other words, the detection voltage VIN+ may be adjusted such that the detection voltage VIN+ becomes greater than the reference voltage VREF when the power supply voltage Vd becomes equal to or greater than the overcharge detection voltage Vdet1) while maintaining on or off states of the switch elements S1 to S4 when adjusting the size ratio X to the optimum value.

Then, with respect to one or more than one switch circuit among the switch circuits A1 to A4 whose switching elements have been turned off when adjusting the size ratio X to the optimum value, the fuse elements of the switch circuits are cut by laser so that on/off states of the switch circuits A1 to A4 are the same as the states of the switch elements S1 to S4 when adjusting the size ratio X to the optimum value. Similarly, magnitude of resistance of the resistor 21 is fixed to the magnitude when the detection voltage VIN+ becomes equal to the desired voltage by, for example, cutting a fuse element or the like by laser.

Therefore, variation in the temperature characteristic of the reference voltage VREF and variation in the overcharge detection voltage Vdet1 can be reduced.

Although the secondary battery protection circuitry has been described in the embodiments, the present invention is not limited to the aforementioned embodiments. Various modifications and enhancements, such as combinations or replacements of some or all of the other embodiments, may be made within the scope of the present invention.

For example, in the above-described embodiment, the second adjustment circuit 28 adjusts voltage corresponding to the overcharge detection voltage Vdet1, but the second adjustment circuit 28 may adjust voltage corresponding to an overdischarge detection voltage Vdet2. For example, the detection circuit 20 may include a circuit having a configuration similar to that of FIG. 4 (voltage divider and comparator), to detect overdischarging of the secondary battery 70. In such a case, an output signal of the comparator is inverted from a non-active level (e.g., low level) to an active level (e.g., high level) when a detected voltage VIN−, which is obtained by dividing the power supply voltage Vd by the voltage divider, drops below the reference voltage VREF. The power supply voltage Vd at the time of occurrence of the inversion is referred to as the overdischarge detection voltage Vdet2. When the power supply voltage Vd lower than the overdischarge detection voltage Vdet2 is detected by the comparator, the detection circuit 20 outputs an active level signal to the control circuit 32 representing a condition in which an overdischarge of the secondary battery 70 is detected.

The main transistor N1 is not limited to a configuration consisting of a single transistor, but may also be configured by multiple transistors.

Also, for example, a position at which the charge control transistor 1 is placed and a position at which the discharge control transistor 2 is placed may be changed with respect to the positions illustrated in the drawings.

Also, the charge control transistor 1 and the discharge control transistor 2 are not limited to a configuration in which the charge control transistor 1 and the discharge control transistor 2 are inserted into the negative current path 9b. The charge control transistor 1 and the discharge control transistor 2 may be inserted into the positive current path 9a.

What is claimed is:

1. A secondary battery protection circuit configured to monitor a state of a secondary battery and to protect the secondary battery when detecting an abnormal state, the secondary battery protection circuit comprising:
    a reference voltage circuit configured to generate a reference voltage by using a depletion-type transistor and a transistor unit of enhancement type connected in series with the depletion-type transistor, the transistor unit including a plurality of enhancement-type transistors;
    a voltage divider configured to obtain a detection voltage by dividing a power source voltage of the secondary battery, and to output the detection voltage;
    a detection circuit configured to detect the abnormal state based on the reference voltage and the detection voltage;
    a first adjustment circuit configured to change a number of enhancement-type transistors that are electrically coupled in the transistor unit, based on a threshold voltage of the depletion-type transistor and a threshold voltage of the transistor unit, to adjust a size ratio of the depletion-type transistor to the transistor unit having the changed number of enhancement-type transistors; and
    a second adjustment circuit configured to adjust the detection voltage based on the reference voltage after the size ratio is adjusted by the first adjustment circuit, such that the detection circuit can detect the power source voltage of the secondary battery reaching a predetermined voltage.

2. The secondary battery protection circuit according to claim 1, wherein the first adjustment circuit is configured to adjust the size ratio by changing a channel length of the transistor unit.

3. The secondary battery protection circuit according to claim 2, wherein
    the transistor unit includes a main transistor, and a plurality of sub transistors connected with the main transistor in series, each of the sub transistors being connected in parallel with a corresponding switch circuit; and
    the first adjustment circuit is configured to change the channel length by disconnecting the corresponding switch circuit connected with at least one of the sub transistors.

4. The secondary battery protection circuit according to claim 3, wherein the switch circuit includes a fuse element that can be cut after the detection voltage is adjusted by the second adjustment circuit, and a switch element configured to change the channel length before the fuse element is cut.

5. The secondary battery protection circuit according to claim 1, wherein the first adjustment circuit is configured to adjust the size ratio by changing a channel width of the transistor unit.

6. The secondary battery protection circuit according to claim 5, wherein
    the transistor unit includes a main transistor, and a plurality of sub transistors each connected in parallel with the main transistor, each of the sub transistors being connected in series with a corresponding switch circuit from among a plurality of switch circuits; and
    the first adjustment circuit is configured to change the channel width by disconnecting at least one switch circuit from among the plurality of switch circuits.

7. The secondary battery protection circuit according to claim 6, wherein the switch circuit includes a fuse element that can be cut after the detection voltage is adjusted by the second adjustment circuit, and a switch element configured to change the channel width before the fuse element is cut.

8. The secondary battery protection circuit according to claim 1, wherein
    the transistor unit includes a main transistor, and a plurality of sub transistors connected with the main transistor, each of the sub transistors being connected with a corresponding switch circuit from among a plurality of switch circuits; and
    the first adjustment circuit is configured to change the size ratio by disconnecting at least one switch circuit from among the plurality of switch circuits.

9. The secondary battery protection circuit according to claim 8, wherein the switch circuit includes a fuse element that can be cut after the detection voltage is adjusted by the second adjustment circuit, and a switch element configured to change the size ratio before the fuse element is cut.

10. The secondary battery protection circuit according to claim 1, wherein the second adjustment circuit is configured to adjust the detection voltage by changing a division ratio of the power supply voltage.

11. The secondary battery protection circuit according to claim 1, wherein the predetermined voltage is an overcharge detection voltage of the secondary battery or an overdischarge detection voltage.

* * * * *